United States Patent
Chow et al.

(10) Patent No.: US 6,904,602 B1
(45) Date of Patent: Jun. 7, 2005

(54) METHOD AND APPARATUS FOR IMPLEMENTING PERSISTENCE IN TRADER SERVICES ASSOCIATED WITH A COMPUTER SYSTEM

(75) Inventors: Ivan Chow, Plano, TX (US); Wing Lee, Irving, TX (US); Dora Potluri, Irving, TX (US); Jiangxiang Yang, Plano, TX (US); Yiqun Ye, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 403 days.

(21) Appl. No.: 09/728,196

(22) Filed: Nov. 30, 2000

(51) Int. Cl.[7] .............................................. G06F 9/46
(52) U.S. Cl. ............... 719/330; 707/103 R; 707/103 Y; 707/103 Z; 707/104.1
(58) Field of Search ....................... 707/1–10, 100–110, 707/200–206; 709/200–253; 719/330–332, 328; 718/100–108

(56) References Cited

U.S. PATENT DOCUMENTS

| | | | |
|---|---|---|---|
| 5,873,092 A | | 2/1999 | Cheng et al. ............... 707/103 |
| 6,044,379 A | * | 3/2000 | Callsen .................... 707/103 R |
| 6,085,030 A | * | 7/2000 | Whitehead et al. ......... 709/203 |
| 6,085,188 A | * | 7/2000 | Bachmann et al. ............. 707/3 |
| 6,092,178 A | | 7/2000 | Jindal et al. ................... 712/27 |
| 6,167,427 A | | 12/2000 | Rabinovich et al. ........ 709/201 |
| 6,324,580 B1 | | 11/2001 | Jindal et al. ................ 709/228 |
| 6,327,622 B1 | | 12/2001 | Jindal et al. ................ 709/228 |
| 6,351,775 B1 | | 2/2002 | Yu .............................. 709/238 |
| 6,360,256 B1 | | 3/2002 | Lim ........................... 709/223 |
| 6,438,590 B1 | | 8/2002 | Gartner et al. .............. 709/219 |
| 6,453,320 B1 | | 9/2002 | Kukura et al. .......... 707/103 R |
| 6,529,947 B1 | | 3/2003 | Feuerman ................... 709/217 |
| 6,571,274 B1 | | 5/2003 | Jacobs et al. ............... 709/203 |
| 6,578,050 B1 | | 6/2003 | Daggubati et al. ........ 707/104.1 |
| 2001/0052016 A1 | | 12/2001 | Skene et al. ................ 709/226 |
| 2002/0099970 A1 | | 7/2002 | Zhao et al. .................... 714/4 |
| 2002/0129134 A1 | | 9/2002 | Leighton et al. ............ 709/223 |
| 2003/0067912 A1 | * | 4/2003 | Mead et al. ................ 370/389 |

OTHER PUBLICATIONS

Ni, Y "Trader Cooperation to Enable Object Sharing among Users of Homogenous Distributed Systems" Jul. 1994 pp. 1–16.*

Craske, G "A Property–based Clustering Approach for the CORBA Trading Service" 1999 pp. 1–9.*

Ariella Richman and Doan Hoang, *Accomplishing Distributed Traders Utilising the X.5000 Directory*, 7 pgs., Basser Department of Computer Science, University of Sidney, NSW 2006 Australia.

Ivan Chow, et al., *Method and Apparatus for Implementing CORBA Complaint Name Services Incorporating Load Balancing Features*, U.S. Appl. No. 09/585,530, filed Jun. 1, 2000, 48 pgs.

(Continued)

*Primary Examiner*—Meng-Al T. An
*Assistant Examiner*—Charles Anya (57) ABSTRACT

The invention comprises methods and apparatus for implementing a trader service. The present invention involves creating a trader service, preferably compliant with the CORBA CosTrader Specification, where the trader service is arranged to store persistent information using a directory service. This aspect involves creating a storage mechanism comprising a directory service, preferably a directory service compliant with LDAP version 2, which is arranged to store the persistent information for the trader service. An additional embodiment may be implemented by creating a data store interface for interacting with the directory service, wherein such interaction comprises the use of protocol compliant with LDAP version 2.

13 Claims, 3 Drawing Sheets

OTHER PUBLICATIONS

"Directory–Enabled Computing: The Directory's Expanding Role," Dec. 28, 1999, The Burton Group's Network Strategy Overview.

"Comparing Directories and Relational Databases: Not a Zero–Sum Game," Jan. 25, 2000, The Burton Group's Network Strategy Overview.

* cited by examiner

METHOD AND APPARATUS FOR IMPLEMENTING PERSISTENCE IN TRADER SERVICES ASSOCIATED WITH A COMPUTER SYSTEM

BACKGROUND OF THE INVENTION

1. Field of Invention

The invention relates generally to methods and apparatuses for implementing trader services in distributed object systems. More particularly, the invention relates to methods and apparatuses for implementing CORBA compliant trader services.

2. Description of Relevant Art

Trader services are often implemented within distributed object systems to enable distributed objects providing a service to advertise the service and be readily identified to other distributed objects seeking such service. One type of a distributed object system which uses trader services includes a distributed object system that is defined under the Common Object Request Broker Architecture (CORBA) specification produced by OMG. Distributed object systems which use trader services may be in the context of an Object Request Broker (ORB) implemented under the CORBA specification from the OMG, Revision 2.0, Revision 2.1, Revision 2.2 and Revision 2.3, all of which are incorporated herein by reference in their entirety. Specifically, the Trading Object Service Specification of the CORBA Services specification, as specified in the CORBA specification from the OMG, may be used to implement trader services. For purposes of this application, programs compliant with CORBA Revision 2.3, 2.2, and 2.1, by definition will be viewed as compliant with CORBA Revision 2.0. Unless otherwise specified, a generic reference to the CORBA Services specification will be presumed to be OMG's CORBA Services Revision 2.0, The components of the CORBA Services specification detailed above which address trader services will be referred to hereinafter as the CORBA CosTrader Specification.

An object trader service (referred to more simply as a "trader service") provides a matchmaking service for objects. An object providing a service registers the availability of the service by invoking an export operation on the trader, passing as parameters information about the offered service. The export operation carries an object reference (to a specific interface) that can be used by a client to invoke operations on the advertised services, a description of the type of the offered service (i.e., the names of the operations to which it will respond, along with their parameter and result types), and information on the distinguishing attributes of the offered service.

The offer space managed by traders may be partitioned to ease administration and navigation. Whenever a potential client wishes to obtain a reference to a service that does a particular job, it invokes an import operation, passing as parameters a description of the service required. Given this import request, the trader service checks appropriate offers for acceptability. To be acceptable, an offer must have a service type that conforms to that requested and have properties consistent with the constraints specified by the import invocation.

A trader service, which may be associated with a trader server, is typically arranged such that, when provided with a service type, the trader service associates the service type with one or a set of responsive interfaces (identified/located by object references) and typically with accompanying property types (or properties) for each interface. The association of the service type with a specific interface and properties, for example, may either be transient or persistent. For a transient trader service, the association between a service type and a specific interface or set of interfaces generally disappears once the program which implements the trader service terminates. More frequently, for a persistent trader service, the association between a service type and an interface or set of interfaces is stored in a data file, and does not disappear once the program which implements the trader service terminates. In general, the implementation of a trader service often includes the implementation of a data structure such as a table (or hash table) to hold bindings between service types and interfaces and, in some cases, properties. Such a data structure, in other words, may be used to associate service types with interfaces, as well as properties. Such a data structure is maintained in a data store and accessed through a data store interface, where such data store may be persistent or transient. To the extent the prior art addresses the use of persistent data stores to support trader services, the prior art has focused on the use of relational databases as the primary vehicle for data storage.

In other areas of programming, alternative methods do exist to the use of relational databases as data stores. One alternative is the use of flat files. Another alternative is the use of directory services. One standardized method of implementing directory services, and data store interfaces to interact with directory services, is the use of the Lightweight Directory Access Protocol version 2, the specification of which is incorporated herein by reference in its entirety. Hereinafter, when discussing this specification, it may also be referred to as LDAP version 2. LDAP version 3 also may be used and its specification is also herein incorporated by reference. LDAP is used as a generic designation for interfaces and protocols compliant with a version of the Lightweight Directory Access Protocol. For purposes of this application, by definition any server or interface which is compliant with LDAP version 3 (or a later version of LDAP) would also be viewed as compliant with LDAP version 2. The converse is not necessarily correct.

SUMMARY OF THE INVENTION

The invention comprises methods and apparatus for implementing a trader service. According to the present invention, a trader service with at least one storage mechanism may be implemented by creating a trader service, preferably compliant with the CORBA CosTrader Specification, where the trader service is arranged to store information in persistent storage. For the purposes of this application "persistent information" will be defined as information which either is stored in persistent storage or is to be stored in persistent storage. The storage mechanism comprises a directory service, preferably a directory service compliant with LDAP version 2, and is arranged to store the persistent information for the trader service. The trader service may be further implemented by creating a data store interface for interacting with the directory service, wherein such interaction comprises the use of protocol compliant with LDAP version 2.

From a different perspective, this aspect of the invention involves a trader service within a computer system, the trader service being arranged to store persistent information. The trader service has at least one storage mechanism arranged to store the persistent information, wherein the storage mechanism comprises a directory service. The trader service also has a data store interface for interacting with the directory service, wherein such interaction comprises the use of protocol compliant with LDAP version 2. In an alternative embodiment such interaction consists essentially of the use of protocol compliant with LDAP version 2. And in a third embodiment, such interaction consists of the use of protocol compliant with LDAP version 2.

Another variation calls for a computer system arranged to implement at least one storage mechanism for a trader service, where the trader service being arranged to store persistent information. The computer system comprises a processor, a data store interface for interacting with the storage mechanism, and at least one storage mechanism arranged to store the persistent information. The storage mechanism is in the form of a directory service encapsulated in the data store interface.

Finally, this aspect may be expressed as a computer program product for implementing a trader service having at least one storage mechanism. The computer program product includes computer code that creates a trader service arranged to store persistent information, computer code that creates a data store interface for interacting with the storage mechanism, and computer code that creates the storage mechanism which is arranged to store the persistent information. In this embodiment, the storage mechanism comprises a directory service and is encapsulated in the data store interface. The computer program product incorporating the above computer codes also includes a computer readable medium that stores the computer codes. In a preferred version of this computer program product, the interaction between the data store interface and the storage mechanism comprises the use of protocol compliant with LDAP version 2 and the directory service is compliant with LDAP version 2. An alternative embodiment of the computer program product specifies that the computer readable medium is a code representation embodied in a carrier wave.

DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The most preferred embodiment of the trader service implementation of the present invention, hereinafter referred to as Trader, offers several key features that are not available in 3rd party solutions. A set of features in the most preferred embodiment is detailed as follows. Trader is preferably integrated with an LDAP server for persistence. Trader may also be used to support federated trading. Trader provides a Java Based GUI tool for browsing and maintaining the offer space. Trader also provides Java based tools which may be used to replicate the offer space or particular partitions of the offer space. Trader supports the use of a lightweight HTTP server for client boot-strapping via standard HTTP 1.0 protocol. While its most preferred embodiment encompasses all of these features, improvement over prior art trader service implementations may be obtained through the employment of any one or any combination of these features. The detailed description will address embodiments incorporating each of these features, but one of skill in the art will recognize that the particular combinations chosen for these example embodiments may be modified while still maintaining improvements over the prior art.

Figure 1:
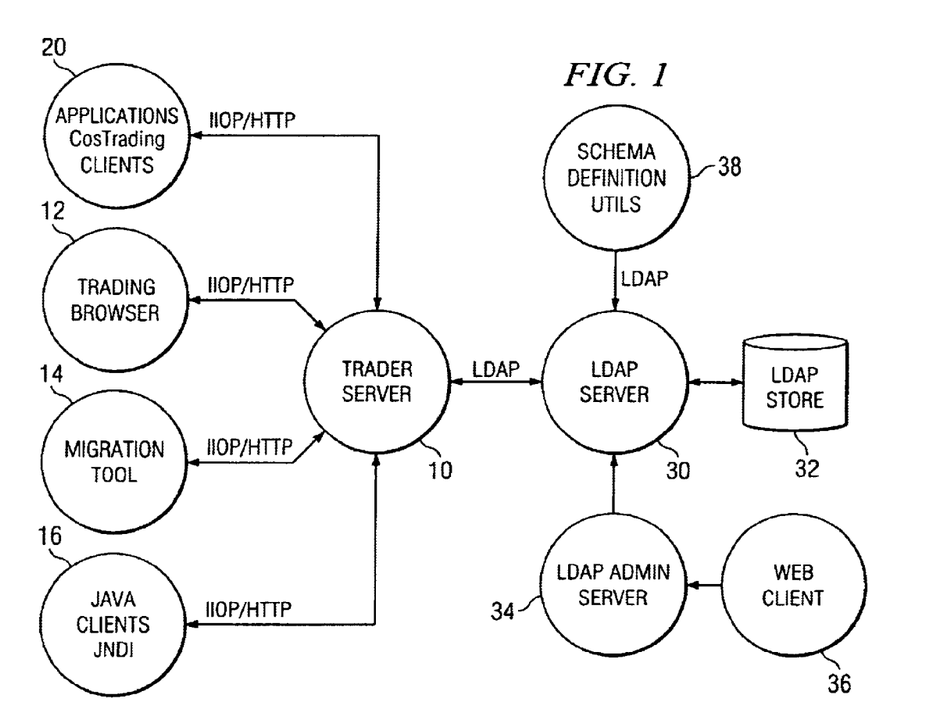
FIG. 1 is a diagrammatic representation of the system architecture of the most preferred embodiment.

FIG. 1 depicts the overall architecture of the most preferred embodiment of Trader. Trader Server 10 implements the CosTrader specification along with HTTP Bootstrapping. Applications (CosTrader Clients) 20 using CORBA 2.2 compliant ORB's can connect to Trader Server 10 using HTTP/IIOP. Trader products working with the Trader server also include Trader Browser 12, Migration tools 14, and JNDI 16 which use standard visibroker java based ORB to communicate to the Trader Server 10. In persistent mode, Trader Server 10 communicates to LDAP Server 30 via LDAP v2 protocol. The LDAP server 30 can be configured to use relational database or disk based persistence as LDAP store 32. LDAP admin server 34 is also installed, to manage more than one instance of LDAP servers 30 from a central console. LDAP admin server 34 provides a central console accessible by web clients 36. Schema definition utilities 38 are also provided in Java that will customize LDAP Schema for Trader usage, and will interactively prompt for user accounts to be created.

The following details apply to the most preferred embodiment of Trader. Trader runs on Solaris 2.6 or HP-UX 11.0. Trader may be accessed from any Operating System as long as the ORB (Object Request Broker) is CORBA 2.2 compliant. Trader is preferably run in a persistent mode. In its persistent mode Trader will use an LDAP server to store the bindings between the service types and the interfaces and properties associated with the service types. In persistent mode, when Trader is restarted, the offer space is rebuilt without any loss of information. Trader preferably will use Zoomit on NT as its LDAP server or Netscape Directory Server 4.1 on Sun Solaris 2.6 & HP-UX 11.0. Trader could be installed in a transient mode where the bindings are stored in temporary hash tables. When Trader is restarted after a transient installation, it will lose all the information it has before shutdown. This mode is ideal for development & unit testing, as it is very easy to install.

Persistence using directory service

The preferred embodiment of Trader specifically involves the use of directory services, particularly LDAP compliant directory services, to provide persistent storage, particularly for trader services which comply with the CORBA CosTrader Specification. The implementation of a trader service providing persistent storage through LDAP compliant directory services is a further development of an effort to provide naming services using LDAP for persistence. This effort by common inventors and under common ownership is detailed in U.S. patent application Ser. No. 09/585,643, filed Jun. 1, 2000, and incorporated herein by reference in its entirety. The following section discusses the details of this preferred embodiment of the trader service.

In developing persistent trader services, the art has inclined towards the use of relational databases such as Oracle, DB2, etc. But there has been recent recognition that the use of relational databases involves trade offs over some of the alternative data stores. One area of discussion has been the relative advantages and disadvantages of the use of directory services as data stores. The recent publication "Directory-Enabled Computing: The Directory's Expanding Role" in The Burton Group's Network Strategy Overview dated Dec. 28, 1999 provides detailed descriptions of the use and functioning of directory services and is incorporated herein by reference. The even more recent publication "Comparing Directories and Relational Databases: Not a Zero-Sum Game" in the Burton Group's Network Strategy Overview dated Jan. 25, 2000, provides a detailed discussion of perceived differences between directory services and relational databases and is incorporated herein by reference.

Directory services and relational databases use diametrically opposed models and are suited for different roles. Directories are best for enabling fast searches for corporate resources, managing users and security, and providing a central integration point for a variety of applications and services. Relational databases are best for more transactional applications in which data changes often and transactional integrity is critical. Nor are the two completely independent. Some directory products actually use relational databases as their directory information base storage system, but even those directory products use a hierarchical, object oriented information model. For the purposes of this application, a directory service is defined as a data store which uses a hierarchical, object oriented information model, rather than the relational data model incorporated by relational databases. Particularly, a data store which interacts with its data store interface through the use of protocol compliant with any version of LDAP, and preferably LDAP version 2, would clearly be within the definition of a directory service.

By using a directory service to provide a persistent data store for the trader service a number of advantages are obtained over the use of relational databases. The persistent data store will be highly scalable for large installations. There will be very low overhead for adding new references. The search capabilities will be very efficient. Directory services, particularly LDAP compliant directory services, have a very strong search model, naming model, information model, and security models as opposed to relational databases. Additionally, the LDAP search model fits particularly well with the CosTrader Model of the CORBA CosTrader Specification. Hence additional synergies may be developed through reduced complexity when a trader service compliant with the CORBA CosTrader Specification uses an LDAP compliant directory service to provide persistence. Finally, the directory service provides built-in support for federation, which can be used to support federation of trader services.

As a result, one embodiment of this invention uses a directory service as the data store to provide persistence to the trader service. The trader service would use at least one storage mechanism to store the persistent information, where the at least one storage mechanism would comprise a directory service. The directory service is preferably compliant with LDAP version 2. The trader service is preferably compliant with the CORBA CosTrader Specification. Between the data store and the rest of the trader service there would be a data store interface which would preferably encapsulate the data store. The data store interface between the data store and the rest of the trader service would preferably communicate with the data store with protocols comprising protocols compliant with LDAP version 2. More preferably, the communications between the data store and the data store interface would consist of protocols compliant with LDAP version 2, but this might not be best for all potential applications.

Figure 2:
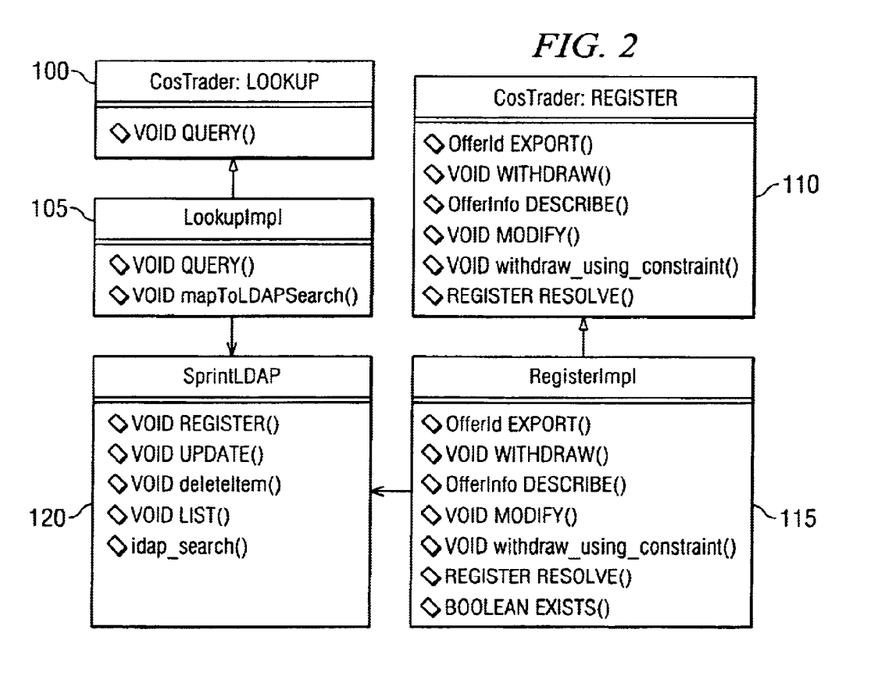
FIG. 2 is an object diagram of the objects instantiated in the preferred embodiment of the trader service.

FIG. 2 is a class diagram of the objects invoked or instantiated in the preferred embodiment of the trader service. The CosTrader Lookup object 100 works through the Lookup Implementation object 105 to read and modify the LDAP object 120. One of the Lookup Implementation object's 105 primary functions is to map the query from CosTrader compliant language used by CosTrader Lookup object 100 to LDAP compliant language understood by LDAP object 120. The CosTrader Register object 110 works through the Register Implementation object 115 to read and modify the LDAP object 110. The methods and variables comprising each class are shown in FIG. 2, and it will be understood that these methods and variables may be modified by one skilled in the art without departing from the scope of the present invention.

Figure 3:
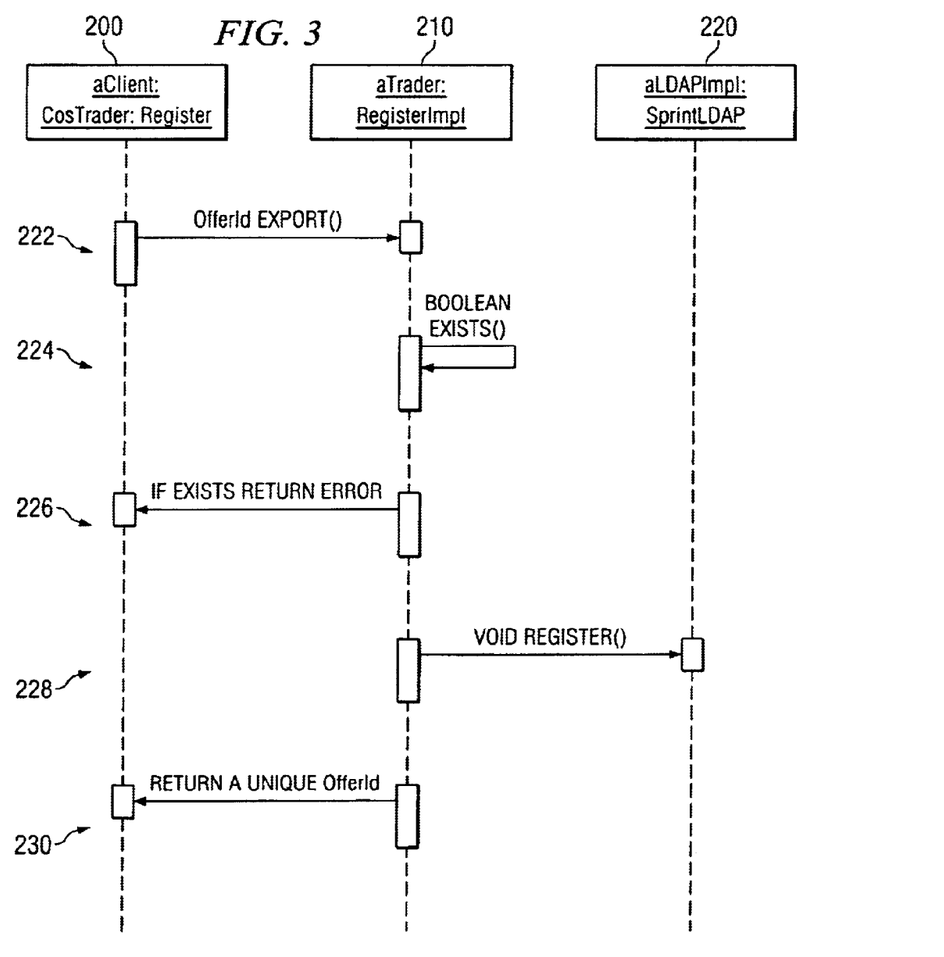
FIG. 3 is a sequence diagram which illustrates the steps associated with exporting offers to a trader server in accordance with an embodiment of the present invention.

FIG. 3 is a sequence diagram which illustrates the steps associated with exporting offers to a trader server in accordance with an embodiment of the present invention. The three primary objects are the client 200, the trader 210, and the directory (preferably an LDAP compliant directory) 220. In the process described client 200 "exports" an offer to trader 210 in step 222. This offer includes a service type, interface (defined by an object reference), and property types associated with the interface. In step 224, trader 210 checks directory 120 to make sure the offer does not already exist in the directory. If the offer is already registered, an error is returned to client 200 in step 226. If the offer is not yet registered, then the offer is registered in directory 220 by trader 210 in step 228. Finally, in step 230, trader 210 returns a unique offerID to client 200.

Figure 4:
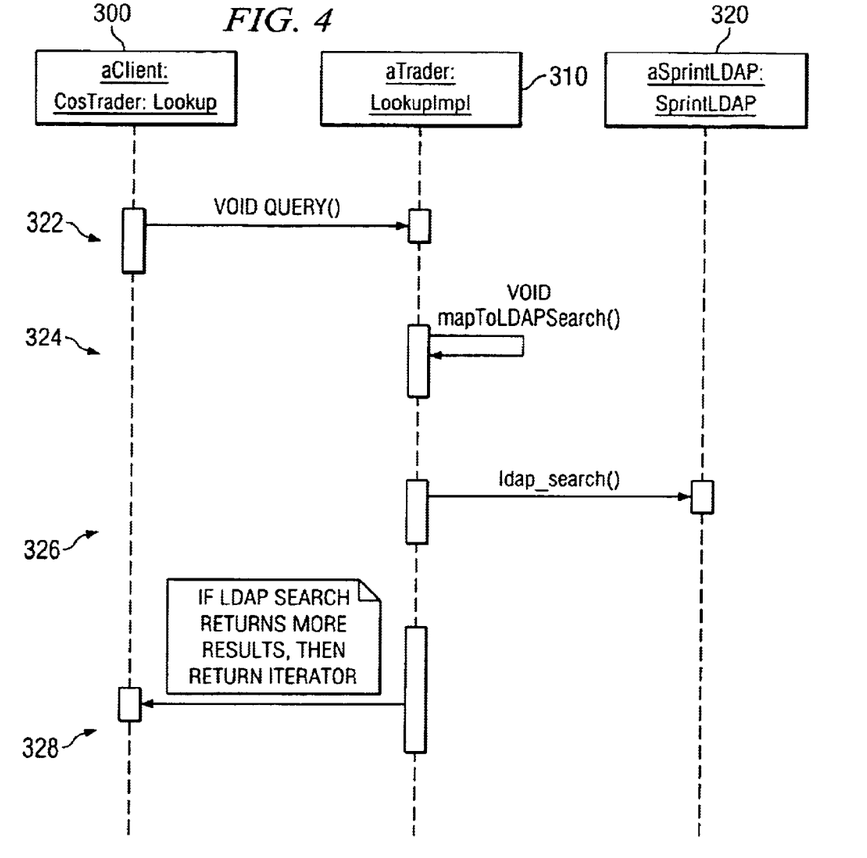
FIG. 4 is a sequence diagram which illustrates the steps associated with searching the offers on a trader server in accordance with an embodiment of the present invention.

FIG. 4 is a sequence diagram which illustrates the steps associated with searching the offers on a trader server in accordance with an embodiment of the present invention. The three primary objects are the client 300, the trader 310, and the directory (preferably an LDAP compliant directory) 320. In the process described client 200 "looksup" or queries trader 310 for offers in step 322. This query includes information on the services sought and often includes additional restrictions to limit the responsive services based on properties defined in association with those services. In step 324, trader 310 converts (or maps) the query to language and protocol (i.e., syntax) compliant with (i.e. understood by) directory 320. In step 326, trader 310 sends the mapped query to directory 320. Instead of implementing the complete search semantics, the preferred approach illustrated here just maps the search grammar from that defined in the CosTrader specification to LDAP syntax. Once that has been accomplished, the search capabilities of the LDAP compliant directory are used to retrieve the entries. Finally, in step 328, trader 310 returns the object references of matching offers to client 300. To the extent that multiple matching offers are retrieved, an iterator within or working with trader 310 provides the object reference of each of the matching offers one at a time to client 300. Different potential methods of determining the order in which the references are provided by trader 310 through the iterator is addressed in more detail in the section on rudimentary fault checking below.

Federated trading service

In federated trading, one instance of a trader service may contain a symbolic link to the services and corresponding interfaces and properties held in a second trader service, possibly on a separate server. In so doing, any requests for such services to the first server could also generate responsive references from the second server which could be provided to the requesting object. By using federated trading, it would only be necessary to bootstrap to one trader service, simplifying the programming model and eliminating or reducing the need to synchronize the affected data stores. Because of the reduction in complexity to federated trading brought about by use of an LDAP compliant directory service for persistence, federated trading is more easily and efficiently accomplished under the present invention. Specifically, the use of an LDAP compliant directory service, with its built-in referral service, creates a simpler implementation of CORBA compliant federated trading by mapping the CosTrader Federation to the LDAP referral service. Additionally, federated trading helps decrease some of the transactional concerns of use of directory service rather than relational database by improving synchronization. Hence one embodiment of the Trader may provide a federated trading service in combination with persistence provided by LDAP directory service.

Replication Tool

One embodiment of the Trader additionally provides Java tools for easier access to and maintenance of the trader service. In one embodiment, a tool may be provided through which the user picks a particular partition of the offer space. The tool will then replicate the directory from that level downwards or from that level upwards at the selection of the user. This replicated directory may be saved for use by a second trader service on the same or on an alternate server. This provides the ability to troubleshoot problems using the second trader service, without interfering with the ongoing production operation of the primary trader service. Additionally, the ability is provided to take a snapshot of a transient data store of a trader service which may be used to maintain the store while the trader service which is being shut down to be maintained, modified, of upgraded. After the maintenance is complete, the copied information may be returned to the upgraded trader service, without need for all programs and systems across the enterprise to re-register. The tools do not have to be java based, but are preferably java-based tools for cross-platform compatibility. The tool may also simply replicate the entire offer space for use by a second trader service to duplicate the production environment for troubleshooting. But the greater flexibility of choosing which partition to start the replication at is preferable.

An additional embodiment involves the use of a java-based tool providing a GUI interface to use to page through the offer space to correct errors or eliminate stale references "by hand." This provides greater ease of use than the traditional command line interfaces used with most current implementations of trader services. The same tool may also be used for browsing the offer space for informational or evaluation purposes. Effectively this tool is a Trader Browser that will let you view & manipulate the offer space. The preferred version of this embodiment provides a Java browser which runs on any system with at least Java Runtime Engine 1.1.7 (JRE 1.1.7) installed and available.

Bootstrapping

One embodiment of Trader provides support of a lightweight HTTP server for client boot-strapping via standard HTTP 1.0 protocol. This HTTP agent enables applications from different ORB vendors to easily bootstrap to the trader service. Without such an agent, applications will either have to hard code the IOR (interoperable object reference) or read from an IOR file distributed by the trader service. Both of these approaches have drawbacks, as they place additional burden on the operations support staff who have to distribute a new IOR file every time Trader has been restarted. Because this embodiment of Trader recognizes a lightweight HTTP protocol through an embedded lightweight HTTP agent, non-visibroker clients are enabled to connect to the trader service. This solves the interoperability problem of the resolve_initial_reference() command, which unfortunately does not recognize other vendors' CORBA services. This problem may be less significant in trader services compliant with the requirements of CORBA Services revision 2.3, but the HTTP bootstrapping still may provide a simpler and more elegant method of entry.

Rudimentary Fault Tolerance

The lookup process typically locates a set of offers which match the request. The object references for these offers are returned one at a time in a defined order to the requesting object. This order is defaulted to "first", where the order of returned matched offers is in the order as the offers are discovered. Alternative preferences for order of delivery of matches called for in the Corba CosTrader Specification include max expression, min expression, with expression, and random. In an alternative embodiment, rudimentary fault tolerance may be added by the addition of an additional sequence of steps to the return of offers. If rudimentary fault tolerance is being employed, then prior to providing the object references responsive to the requested service, the object references associated with the matched offers are checked to see if they are existent. The check for existence is preferably a "non-existent" call, but alternatively could use an "is_a" method or both depending on the circumstances. This fault tolerance check could be used during evaluation of the preferences to develop the order in which the object references for the matched offers will be returned. Alternatively, the rudimentary fault tolerance check could be performed after the preference has been applied and the matched offers sorted, immediately prior to returning each object reference corresponding to a matched offer to the requestor.

If the fault tolerance is being applied during development of the order, then any object reference which fails the fault tolerance check will be moved to the end of the ordered list, but will remain on the list.

If the fault tolerance is being applied after the list has been ordered, then the object reference will be skipped and the next object reference in line will be checked and sent to the requestor if it passes the check. If all of the matched offers have been checked and all have checked as non-existent and no unchecked matching offers remain, then in the preferred embodiment, the list will be cycled back to the original order and the first object reference from the originally developed order will be returned to the requestor without fault checking. In essence, the list will recycle back to the beginning and move forward from there without fault tolerance checking.

Alternative fault tolerance embodiments could use any of several alternative procedures where all of the object references corresponding to matched offers have failed a fault tolerance check. The trader service could throw a not found exception. The trader service could go back to the original order to continue cycling through the entire list of matched offers a defined number of times until one of the preliminarily identified entries checks as existent or until the number of cycles determined by the programmer runs out. The trader service could determine randomly an entry to return. The trader service could return the last matched offer which successfully returned existent, even if that matched offer did not return existent during this particular process. Those of skill in the art will recognize that other selection options could exist at this point. Regardless of the possibility of the proffered alternatives, it is preferred to use the simple once through fault tolerance described above. The use of this option provides the reason that this process is referred to as rudimentary fault tolerance. Most of the other options would provide more complete fault tolerance but would come at the expense of additional overhead. Returning an exception is also not as preferred, because events over time may have an object return non-existent at one moment, but by the time the client goes to the object the object may be existent again. Finally, the client probably has its own programming defining what steps it would prefer to take if the object it is seeking is non-existent. These client specific steps are more directly tailored for the client than any process which could be defined on the server level resolve being addressed here. For example, the client might send an activation agent, or the client might have an alternative service in mind to try to look up. It is considered preferable to perform the rudimentary fault tolerance, but not use additional time and resources on the server side for best overall efficiency.

Computer Systems

Figure 5:
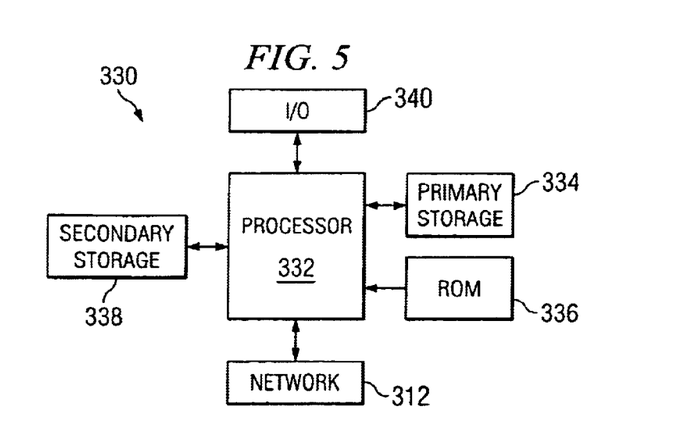
FIG. 5 is a diagrammatic representation of a computer system suitable for implementing the present invention.

A trader service as described above may generally be implemented on a variety of different computer systems. FIG. 5 illustrates a typical, general-purpose computer system suitable for implementing the present invention. The computer system 330 includes a processor 332 (also referred to as a central processing units, or CPU) that is coupled to memory devices including primary storage devices 336 (typically a read only memory, or ROM) and primary storage devices 334 (typically a random access memory, or RAM). As is well known in the an, ROM acts to transfer data and instructions uni-directionally to CPU 332, while RAM is used typically to transfer data and instructions in a bi-directional manner. Both storage devices 334, 336 may include any suitable computer-readable media. A secondary storage medium 338, which is typically a mass memory device, is also coupled bi-directionally to CPU 332 and provides additional data storage capacity. The mass memory device 338 is a computer-readable medium that may be used to store programs including computer code, data, and the like. Typically, mass memory device 338 is a storage medium such as a non-volatile memory such as a hard disk or a tape which generally slower than primary storage devices 334, 336. Mass memory storage device 338 may take the form of a magnetic or paper tape reader or some other well-known device. It will be appreciated that the information retained within the mass memory device 338, may, in appropriate cases, be incorporated in standard fashion as part of RAM 336 as virtual memory. A specific primary storage device 334 such as a CD-ROM may also pass data uni-directionally to the CPU 332.

CPU 332 are also coupled to one or more input/output devices 340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 332 optionally may be coupled to a computer or telecommunications network, e.g., an internet network, or an intranet network, using a network connection as shown generally at 312. With such a network connection, it is contemplated that CPU 332 might receive information from the network, or might output information to the network in the course of performing the above-described method steps. Such information, which is often represented as a sequence of instructions to be executed using CPU 332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network.

Although only a few embodiments of the present invention have been described, it should be understood that the present invention may be embodied in many other specific forms without departing from the spirit or the scope of the present invention. By way of example, the steps associated with performing register operations and lookup operations may generally be reordered, added, and removed. Similarly, some or all of the arguments used in the performance of a register operation may also be checked for validity without departing from the spirit or the scope of the present invention.

Additionally, it should be appreciated that the data storage mechanisms, or data stores, used to store bindings may also be widely varied. Data storage mechanisms may generally include computer hard drives and tape drives. Further, data storage mechanisms may be located anywhere within a computer network.

Therefore, the present examples are to be considered as illustrative and not restrictive, and the invention is not to be limited to the details given herein, but may be modified within the scope of the appended claims along with their full scope of equivalents.

What is claimed is:

1. A computer-implemented method for implementing a trader service with fault tolerance, the method comprising;
   creating a trader service;
   identifying an object reference in response to a request by a requestor, the object reference including a reference to an object;
   determining whether the object associated with the object reference is existent;
   providing the object reference to the requestor when the object is not existent;
   organizing at least a first entry associated with the object reference in an index; identifying a second object reference in response to the request by the requestor, the second object reference including a reference to a second object;
   determining whether the second object associated with the second object reference is existent; and
   where if the second object is not existent organizing at least a second entry associated with the second object reference in the index, the second entry positioned in the index behind the fast entry.

2. The computer-implemented method of claim 1, further comprising:
   identifying a plurality of object references in response to the request by the requestor, the plurality of object reference each including a separate reference to each of a plurality objects;
   sequentially determining whether the cacti object associated with each reference is existent; and
   as each of the plurality of objects are determined not existent, organizing a separate entry associated with each of the plurality of object references in the index, each of the plurality of entries positioned in the index behind the previously organized entry.

3. A computer-implemented method for implementing a trader service with fault tolerance, the method comprising:
   creating a first trader service;
   creating a second trader service;
   identifying, by one of the first and second trader services, a plurality of object references in response to a request by a requestor, the plurality of object references each including a reference to one of a plurality of objects;

determining whether each of the plurality of objects associated with one of the plurality of object references is existent;

organizing an entry associated with each one of the plurality of object references in an index, the entries ordered based on a sequence in which the associated objects reference are identified, and wherein when the related object is not existent the entry related therewith is placed at the bottom of the index; and for a first existent object of the plurality of objects, providing the first object reference to the requestor, and wherein when each of the plurality of objects is not existent, providing the object reference for a first not existent object of the plurality of objects to the requestor.

4. The computer-implemented method claim 3, wherein the first trader service arranged to store persistent information, and further comprising:

creating at least one storage mechanism arranged to store the persistent information, and wherein the at least one storage mechanism comprises an LDAP compliant directory service, the first trader service maintaining a reference link to services of the second trader service such that the LDAP compliant directory service supports the first trader service reference to services of the second trader service.

5. The computer-implemented method of claim 4, wherein in the first and second trader services are further defined as CORBA CosTrader Specification compliant.

6. A computer-implemented method for implementing federated trader services, method comprising:

creating a first trader service, the first trader service arranged to store persistent information and wherein the first trader service is CORBA CosTrader Specification compliant;

creating at least one storage mechanism arranged to store the persistent information, and wherein the at least one storage mechanism comprises an LDAP compliant directory service;

creating a second trader service arranged to store persistent information, the second trader service CORBA CosTrader Specification compliant, the first trader service maintaining a reference link to services of the second trader service such that the LDAP compliant directory service supports the first trader service reference to services of the second trader service;

receiving a request by the first trader service from a requestor, and generating a responsive reference to the requestor from the second trader service;

organizing at least a first entry associated with the responsive reference in an index;

identifying a second reference in response to the request by the requestor, the second reference including a reference to a second object;

determining whether the second object associated with the second reference is existent; and where if the second object is not existent organizing at least a second entry associated with the second reference in the index, the second entry positioned in the index behind the first entry.

7. The computer-implemented method of claim 6, wherein the first and second trader services are operable on different servers.

8. The computer-implemented method of claim 6, wherein the first trader service being arranged to store persistent information, and further comprising creating at least one storage mechanism arranged to store the persistent information; wherein the at least one storage mechanism comprises a directory service.

9. The computer-implemented method of claim 8, wherein the directory service is compliant with LDAP version 2.

10. The computer-implemented method of claim 8, wherein:

the interaction between the data store interface and the at least one storage mechanism comprises the use of protocol compliant with LDAP version 2, and wherein the directory service is compliant with LDAP version 2.

11. A computer-implemented service comprising:

a trader service operable to provide object references based on a description of a service received from a requestor, the trader service CORBA CosTrader Specification compliant;

an HTTP agent operable to receive the description of the service requested by the requestor and communicate the description of the service to the trader service, the HTTP agent operable to receive the object reference from the trader service and provide the object reference to requestor;

wherein the requestor includes a first trader service compatible requestor operable to compatibly communicate requests for descriptions of services to the trader service and receive object references from the trader service, and a second trader service non-compatible requestor using the HTTP agent to promote the exchange of descriptions of services to the trader service and receive the object references from the trader service;

organizing at least a first entry associated with a first object reference in an index in response to a request from the requestor;

identifying a second object reference in response to the request by the requestor, the second reference including a reference to a second object;

determining whether the second object associated with the second reference is existent; and where if the second object is not existent organizing at least a second entry associated with the second object reference in the index, the second entry positioned in the index behind the first entry.

12. The computer-implemented service of claim 11, wherein the requester is further defined as a non-CORBA object request broker vendor application.

13. The computer-implemented service of claim 11, wherein the HTTP agent is further defined as providing support by the trade service of a lightweight HM service for the requestor to bootstrap via HTTP protocol.

* * * * *